(12) United States Patent
Boardman et al.

(10) Patent No.: US 10,724,740 B2
(45) Date of Patent: Jul. 28, 2020

(54) FUEL NOZZLE ASSEMBLY WITH IMPINGEMENT PURGE

(71) Applicant: General Electric Company, Schenectady, NY (US)

(72) Inventors: Gregory Allen Boardman, Liberty Township, OH (US); Marco Venturato, Cincinnati, OH (US); Douglas Downey Turner, West Chester, OH (US); Valeria Proano Cadena, Cincinnati, OH (US); William Thomas Bennett, Danvers, MA (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 15/343,746

(22) Filed: Nov. 4, 2016

(65) Prior Publication Data
US 2018/0128488 A1 May 10, 2018

(51) Int. Cl.
*F23R 3/28* (2006.01)
*F23R 3/00* (2006.01)
*F23R 3/10* (2006.01)
*F02C 7/22* (2006.01)

(52) U.S. Cl.
CPC ............ *F23R 3/283* (2013.01); *F02C 7/22* (2013.01); *F23R 3/002* (2013.01); *F23R 3/007* (2013.01); *F23R 3/10* (2013.01); *Y02T 50/675* (2013.01)

(58) Field of Classification Search
CPC .... F23R 3/286; F23R 3/04; F23R 3/10; F23R 3/28; F23R 3/283; F23R 2900/03041; F23R 2900/03042; F23R 2900/03043; F23R 2900/03044
See application file for complete search history.

(56) References Cited

U.S. PATENT DOCUMENTS

| | | | |
|---|---|---|---|
| 3,917,173 A | 11/1975 | Singh | |
| 4,085,581 A | 4/1978 | Caruel et al. | |
| 4,100,733 A | 7/1978 | Striebel et al. | |
| 4,177,637 A | 12/1979 | Pask | |
| 4,365,470 A * | 12/1982 | Matthews | F23R 3/283 60/740 |
| 4,408,461 A | 10/1983 | Bruhwiler et al. | |

(Continued)

OTHER PUBLICATIONS

Srinivasan et al., "Improving low load combustion, stability, and emissions in pilot-ignited natural gas engines", Journal of Automobile Engineering, Sage journals, vol. 220, No. 2, pp. 229-239, Feb. 1, 2006.

(Continued)

*Primary Examiner* — Steven M Sutherland
(74) *Attorney, Agent, or Firm* — Dority & Manning, P.A.

(57) ABSTRACT

The present disclosure is directed to a fuel nozzle for a gas turbine engine, the fuel nozzle defining a radial direction, a longitudinal direction, a circumferential direction, an upstream end, and a downstream end. The fuel nozzle includes an aft body coupled to at least one fuel injector. The aft body defines a forward wall and an aft wall each extended in the radial direction, and a plurality of sidewalls extended in the longitudinal direction. The plurality of sidewalls couples the forward wall and the aft wall. At least one sidewall defines an impingement fluid outlet, and the aft body defines an impingement fluid cavity in fluid communication with the impingement fluid outlet.

18 Claims, 7 Drawing Sheets

(56) References Cited

U.S. PATENT DOCUMENTS

| | | | |
|---|---|---|---|
| 4,412,414 A | 11/1983 | Novick et al. | |
| 4,689,961 A | 9/1987 | Stratton | |
| 4,914,918 A * | 4/1990 | Sullivan | F23D 11/36 |
| | | | 60/756 |
| 4,967,561 A | 11/1990 | Bruhwiler et al. | |
| 5,142,871 A * | 9/1992 | Lampes | F23R 3/10 |
| | | | 60/756 |
| 5,207,064 A | 5/1993 | Ciokajlo et al. | |
| 5,211,675 A | 5/1993 | Bardey et al. | |
| 5,253,471 A | 10/1993 | Richardson | |
| 5,265,409 A | 11/1993 | Smith, Jr. et al. | |
| 5,307,634 A | 5/1994 | Hu | |
| 5,323,604 A | 6/1994 | Ekstedt et al. | |
| 5,417,069 A | 5/1995 | Alary et al. | |
| 5,511,375 A | 4/1996 | Joshi et al. | |
| 5,592,821 A | 1/1997 | Alary et al. | |
| 5,619,855 A | 4/1997 | Burrus | |
| 5,622,054 A | 4/1997 | Tingle | |
| 5,657,633 A | 8/1997 | Brueggert | |
| 5,682,747 A | 11/1997 | Brown et al. | |
| 5,829,967 A | 11/1998 | Chyou | |
| 5,839,283 A | 11/1998 | Dobbeling | |
| 5,930,999 A | 8/1999 | Howell et al. | |
| 5,937,653 A | 8/1999 | Alary et al. | |
| 5,941,076 A | 8/1999 | Sandelis | |
| 5,956,955 A | 9/1999 | Schmid | |
| 5,974,805 A | 11/1999 | Allen | |
| 6,038,861 A | 3/2000 | Amos et al. | |
| 6,286,298 B1 | 9/2001 | Burrus et al. | |
| 6,295,801 B1 | 10/2001 | Burrus et al. | |
| 6,298,667 B1 | 10/2001 | Glynn et al. | |
| 6,331,109 B1 | 12/2001 | Paikert et al. | |
| 6,442,939 B1 | 9/2002 | Stuttaford et al. | |
| 6,460,339 B2 | 10/2002 | Nishida et al. | |
| 6,536,216 B2 | 3/2003 | Halila et al. | |
| 6,539,721 B2 | 4/2003 | Oikawa et al. | |
| 6,539,724 B2 | 4/2003 | Cornwell et al. | |
| 6,564,555 B2 | 5/2003 | Rice et al. | |
| 6,594,999 B2 | 7/2003 | Mandai et al. | |
| 6,598,584 B2 | 7/2003 | Beck et al. | |
| 6,758,045 B2 | 7/2004 | Dimov et al. | |
| 6,772,594 B2 | 8/2004 | Nishida et al. | |
| 6,837,050 B2 | 1/2005 | Mandai et al. | |
| 6,837,051 B2 | 1/2005 | Mandai et al. | |
| 6,871,501 B2 | 3/2005 | Bibler et al. | |
| 6,915,637 B2 | 7/2005 | Nishida et al. | |
| 6,962,055 B2 | 11/2005 | Chen et al. | |
| 7,036,482 B2 | 5/2006 | Beck et al. | |
| 7,188,476 B2 | 3/2007 | Inoue et al. | |
| 7,200,998 B2 | 4/2007 | Inoue et al. | |
| 7,313,919 B2 | 1/2008 | Inoue et al. | |
| 7,360,363 B2 | 4/2008 | Mandai et al. | |
| 7,565,803 B2 | 7/2009 | Li et al. | |
| 7,596,949 B2 | 10/2009 | DeVane et al. | |
| 7,677,026 B2 | 3/2010 | Conete et al. | |
| 7,770,397 B2 | 8/2010 | Patel et al. | |
| 7,788,929 B2 | 9/2010 | Biebel et al. | |
| 7,810,333 B2 | 10/2010 | Kraemer et al. | |
| 7,966,801 B2 | 6/2011 | Umeh et al. | |
| 8,112,999 B2 | 2/2012 | Zuo | |
| 8,161,751 B2 | 4/2012 | Hall | |
| 8,166,763 B2 | 5/2012 | Piper et al. | |
| 8,276,385 B2 | 10/2012 | Zuo et al. | |
| 8,316,644 B2 | 11/2012 | Wilbraham | |
| 8,322,143 B2 | 12/2012 | Uhm et al. | |
| 8,365,533 B2 | 2/2013 | Johnson et al. | |
| 8,424,311 B2 | 4/2013 | York et al. | |
| 8,511,087 B2 | 8/2013 | Fox et al. | |
| 8,528,337 B2 | 9/2013 | Berry et al. | |
| 8,539,773 B2 | 9/2013 | Ziminsky et al. | |
| 8,590,311 B2 | 11/2013 | Parsania et al. | |
| 8,621,870 B2 | 1/2014 | Carroni et al. | |
| 8,671,691 B2 | 3/2014 | Boardman et al. | |
| 8,701,417 B2 | 4/2014 | Nicholls et al. | |
| 8,863,524 B2 | 10/2014 | Karlsson et al. | |
| 8,938,971 B2 | 1/2015 | Poyyapakkam et al. | |
| 8,943,835 B2 | 2/2015 | Corsmeier et al. | |
| 9,091,444 B2 | 7/2015 | Turrini et al. | |
| 9,175,855 B2 | 11/2015 | Wegerif et al. | |
| 9,322,560 B2 | 4/2016 | Erbas-Sen et al. | |
| 9,335,050 B2 | 5/2016 | Cunha et al. | |
| 9,377,192 B2 | 6/2016 | Hirata et al. | |
| 9,388,985 B2 | 7/2016 | Wu et al. | |
| 9,416,973 B2 | 8/2016 | Melton et al. | |
| 9,423,137 B2 | 8/2016 | Nickolaus | |
| 2003/0101729 A1 | 6/2003 | Srinivasan | |
| 2004/0103668 A1 * | 6/2004 | Bibler | F23R 3/002 |
| | | | 60/776 |
| 2007/0245742 A1 | 10/2007 | Dahlke et al. | |
| 2010/0300106 A1 | 12/2010 | Edwards et al. | |
| 2011/0016871 A1 | 1/2011 | Kraemer et al. | |
| 2011/0083439 A1 | 4/2011 | Zuo et al. | |
| 2011/0252803 A1 | 10/2011 | Subramanian et al. | |
| 2012/0096866 A1 | 4/2012 | Khan et al. | |
| 2012/0131923 A1 | 5/2012 | ElKady et al. | |
| 2012/0285173 A1 | 11/2012 | Poyyapakkam et al. | |
| 2013/0042625 A1 | 2/2013 | Barker et al. | |
| 2013/0199188 A1 | 8/2013 | Boardman et al. | |
| 2013/0239581 A1 | 9/2013 | Johnson et al. | |
| 2013/0336759 A1 | 12/2013 | Christians | |
| 2014/0060060 A1 | 3/2014 | Bernero et al. | |
| 2014/0290258 A1 | 10/2014 | Gerendas et al. | |
| 2015/0033746 A1 | 2/2015 | Carey et al. | |
| 2015/0076251 A1 | 3/2015 | Berry | |
| 2015/0128607 A1 | 5/2015 | Lee | |
| 2015/0159875 A1 | 6/2015 | Berry et al. | |
| 2015/0241064 A1 | 8/2015 | Boardman et al. | |
| 2015/0354818 A1 | 12/2015 | Lebel et al. | |
| 2016/0010856 A1 | 1/2016 | Biagioli et al. | |
| 2016/0054004 A1 | 2/2016 | Stoia et al. | |
| 2016/0131363 A1 | 5/2016 | Cunha et al. | |
| 2016/0169110 A1 | 6/2016 | Myers et al. | |
| 2016/0209036 A1 | 7/2016 | Cheung | |
| 2016/0298841 A1 | 10/2016 | Papple et al. | |
| 2016/0298848 A1 * | 10/2016 | Geary | F23R 3/286 |
| 2018/0100652 A1 | 4/2018 | Vranjic et al. | |
| 2018/0195725 A1 | 7/2018 | Bennett et al. | |

OTHER PUBLICATIONS

Snyder et al., "Emission and Performance of a Lean-Premixed Gas Fuel Injection System for Aeroderivative Gas Turbine Engines", Journal of Engineering for Gas Turbines and Power, ASME Digital Collection, vol. 118, Issue 1, pp. 38-45, Jan. 1, 1996.

International PCT Search Report Corresponding to Application No. PCT-US2017067760 dated Apr. 16, 2018.

* cited by examiner

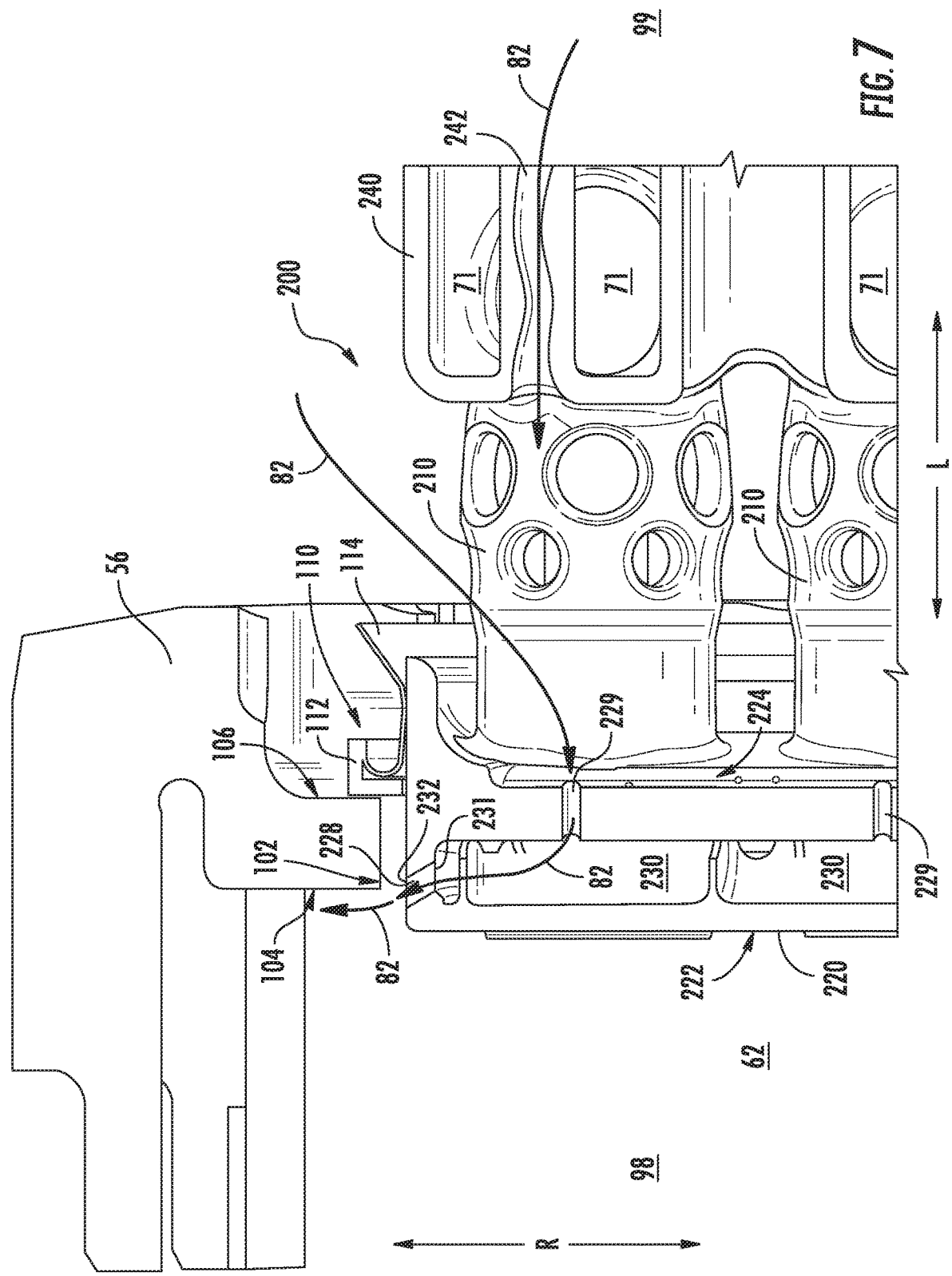

FUEL NOZZLE ASSEMBLY WITH IMPINGEMENT PURGE

FIELD

The present subject matter relates generally to gas turbine engine combustion assemblies. More particularly, the present subject matter relates to a fuel nozzle and combustor assembly for gas turbine engines.

BACKGROUND

Aircraft and industrial gas turbine engines include a combustor in which fuel is burned to input energy to the engine cycle. Typical combustors incorporate one or more fuel nozzles whose function is to introduce liquid or gaseous fuel into an air flow stream so that it can atomize and burn. General gas turbine engine combustion design criteria include optimizing the mixture and combustion of a fuel and air to produce high-energy combustion.

However, producing high-energy combustion often produces conflicting and adverse results that must be resolved. For example, high-energy combustion often results in high temperatures that require cooling air to mitigate wear and degradation of combustor assembly components. However, utilizing cooling air to mitigate wear and degradation of combustor assembly components may reduce combustion and overall gas turbine engine efficiency.

Therefore, a need exists for a fuel nozzle assembly that may produce high-energy combustion while minimizing structural wear and degradation and mitigating combustion and overall gas turbine engine efficiency loss.

BRIEF DESCRIPTION

Aspects and advantages of the invention will be set forth in part in the following description, or may be obvious from the description, or may be learned through practice of the invention.

The present disclosure is directed to a fuel nozzle for a gas turbine engine, the fuel nozzle defining a radial direction, a longitudinal direction, a circumferential direction, an upstream end, and a downstream end. The fuel nozzle includes an aft body coupled to at least one fuel injector. The aft body defines a forward wall and an aft wall each extended in the radial direction, and a plurality of sidewalls extended in the longitudinal direction. The plurality of sidewalls couples the forward wall and the aft wall. At least one sidewall defines an impingement fluid outlet, and the aft body defines an impingement fluid cavity in fluid communication with the impingement fluid outlet.

A further aspect of the present disclosure is directed to a combustor assembly for a gas turbine engine. The combustor assembly includes at least one fuel nozzle assembly and a bulkhead including a wall extended in the radial direction, the longitudinal direction, and in a circumferential direction, wherein a longitudinal portion of the wall is adjacent to the impingement fluid outlet.

A still further aspect of the present disclosure is directed to a method of thermal management for a combustor assembly. The method includes directing a cooling fluid to at least one fuel nozzle, directing the cooling fluid through an impingement fluid inlet of the fuel nozzle, and ejecting the cooling fluid from an impingement fluid outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 is a flowchart of a method of thermal management of a combustor assembly and FIG. 7 is an axial cross sectional view of an exemplary embodiment of a fuel nozzle and bulkhead of a combustor assembly.

Figure 1:
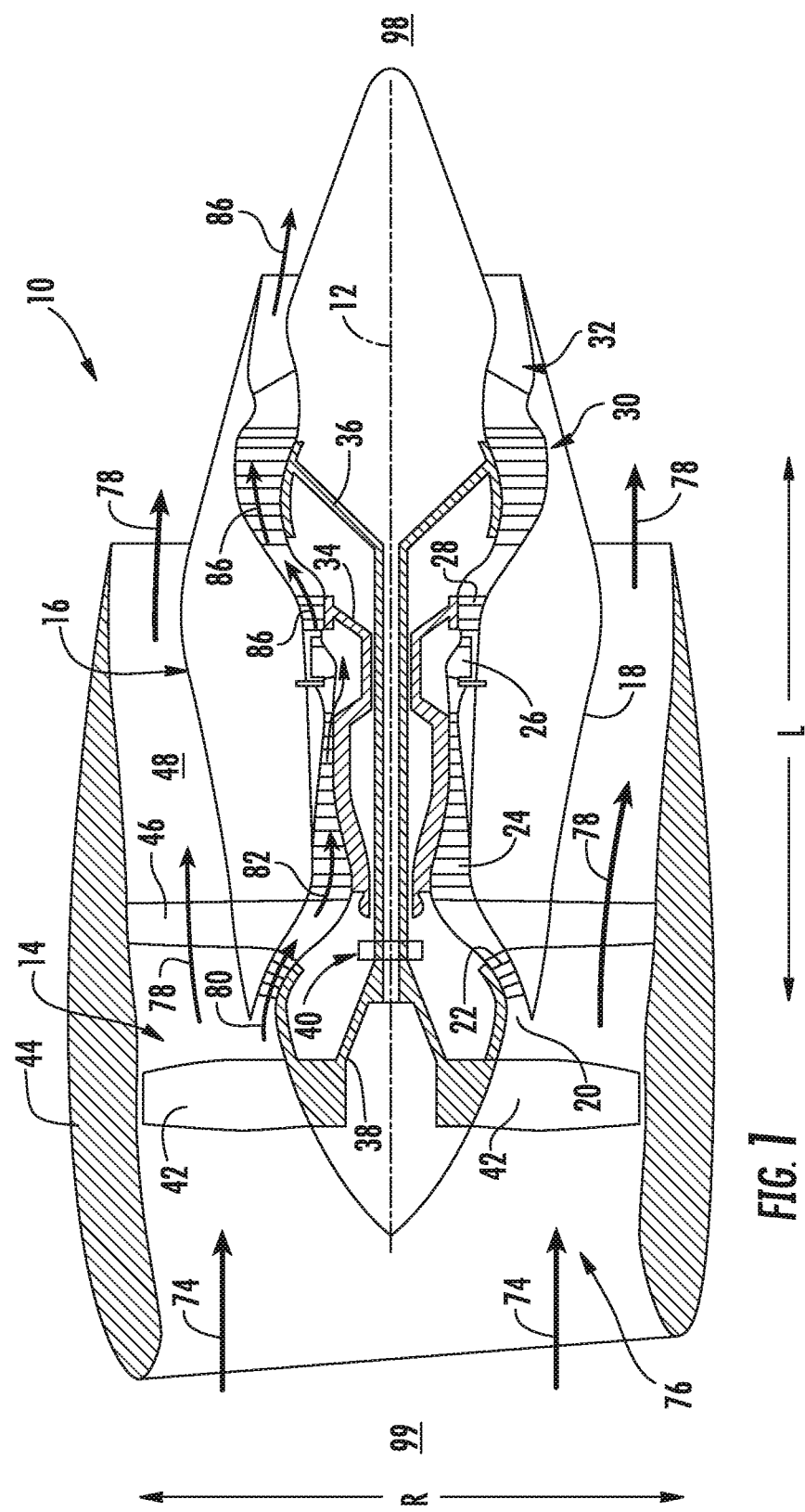
FIG. 1 is a partial schematic cross sectional view of an exemplary gas turbine engine incorporating an exemplary embodiment of a fuel nozzle and combustor assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a fuel nozzle and combustor assembly with impingement purge are generally provided. The embodiments provided generally herein may provide thermal management to the fuel nozzle while minimizing a quantity of compressed air utilized for thermal management, thereby mitigating combustion and overall gas turbine engine efficiency loss. In various embodiments, the compressed air utilized for thermal management of the fuel nozzle is additionally utilized to provide thermal management to a combustor bulkhead. In still other embodiments, the combustor assembly provides cooling air to the fuel nozzle(s) and bulkhead while minimizing compressed air usage and providing high-energy combustion.

Referring now to the drawings, FIG. 1 is a schematic partially cross-sectioned side view of an exemplary high by-pass turbofan jet engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 further defines a radial direction R, a longitudinal direction L, an upstream end 99, and a downstream end 98. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
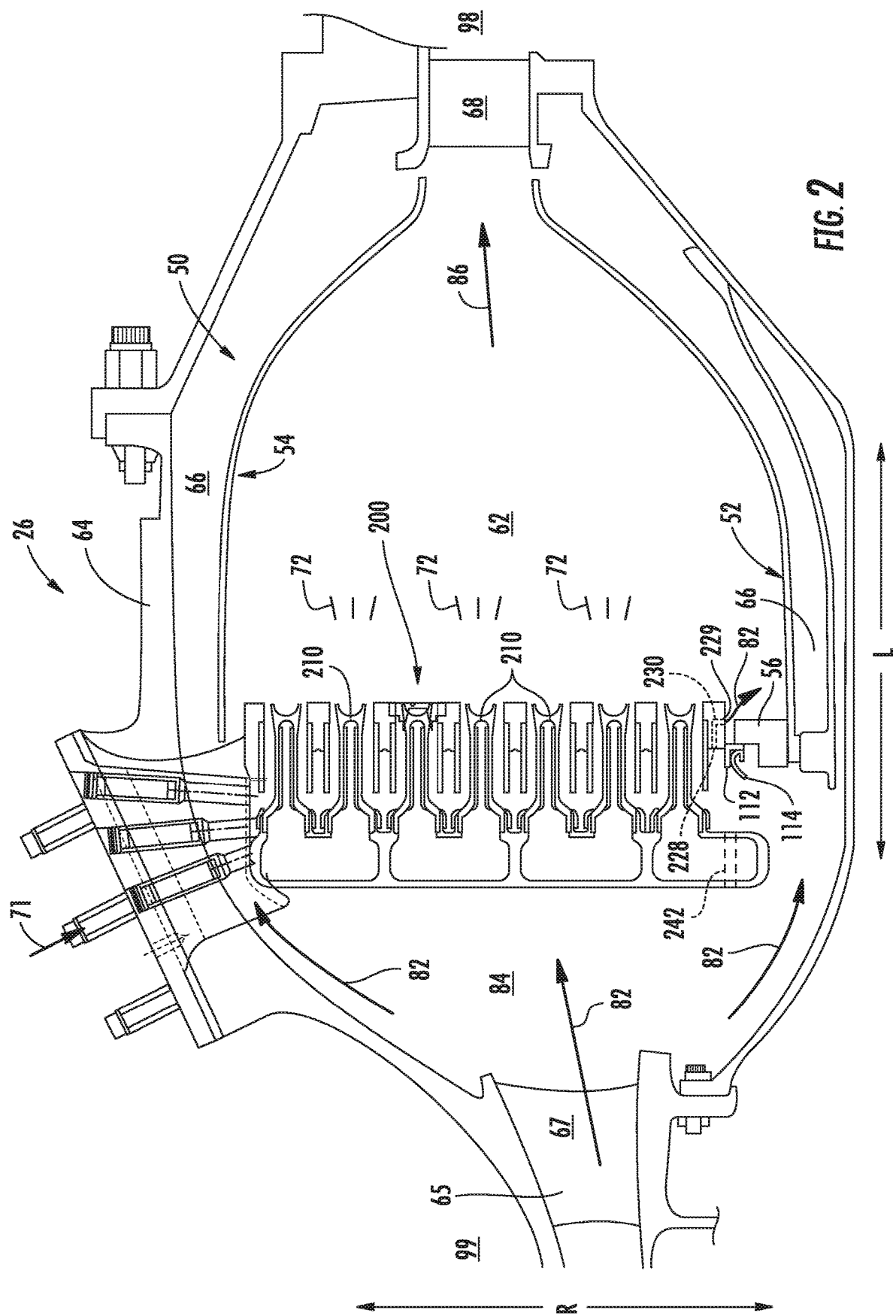
FIG. 2 is an axial cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include an annular type combustor assembly 50 having an annular inner liner 52, an annular outer liner 54 and a bulkhead 56, in which the bulkhead 56 extends radially between the inner liner 52 and the outer liner 54, respectfully, at the upstream end 99 of each liner 52, 54. In other embodiments of the combustion section 26, the combustor assembly 50 may be a can or can-annular type. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within an outer casing 64. An outer flow passage 66 may be defined around the inner liner 52 and/or the outer liner 54. The inner liner 52 and the outer liner 54 may extend along longitudinal direction L from the bulkhead 56 towards a turbine nozzle or inlet 68 to the HP turbine 28 (FIG. 1), thus at least partially defining a hot gas path between the combustor assembly 50 and the HP turbine 28.

Figure 3:
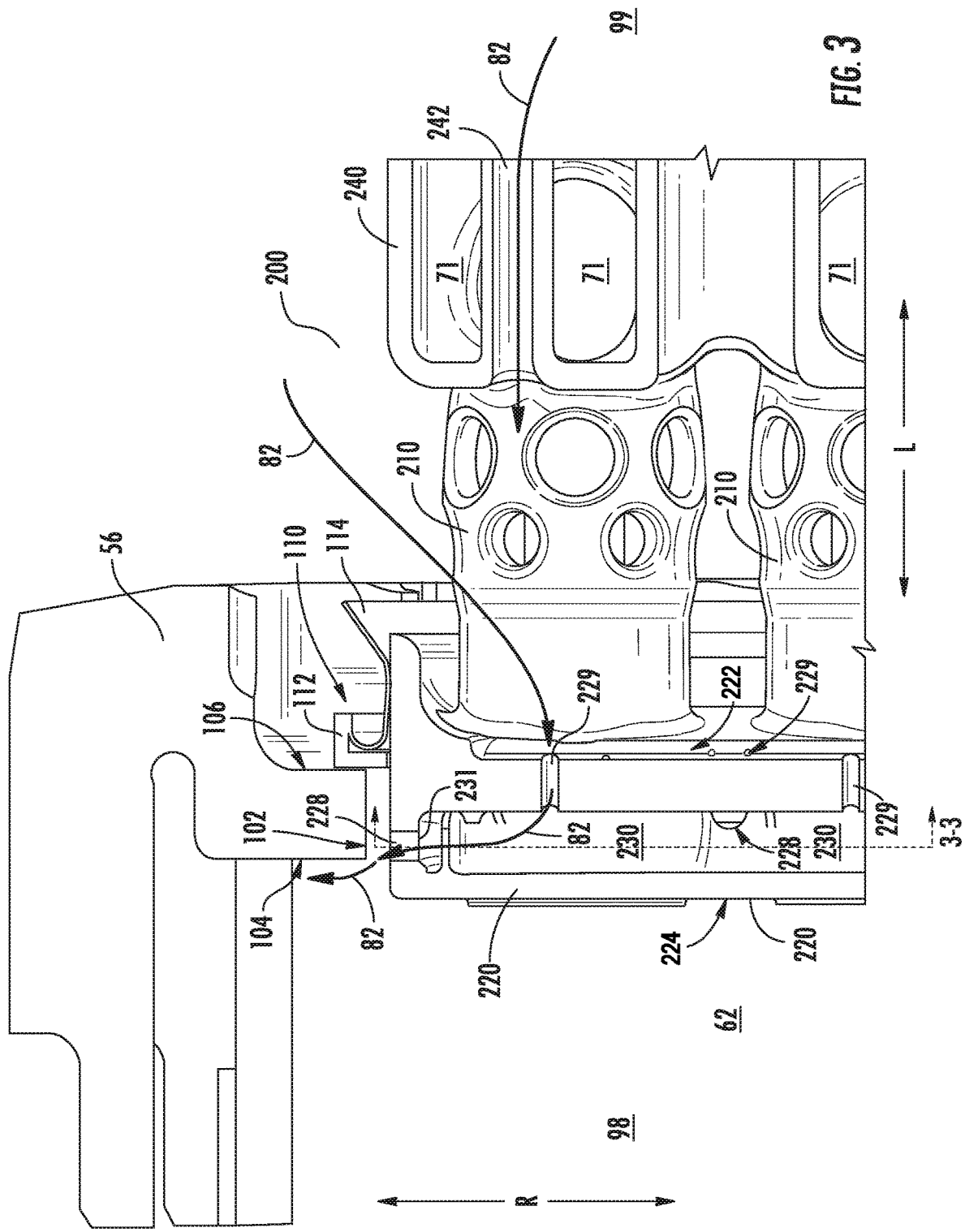
FIG. 3 is an axial cross sectional view of an exemplary embodiment of a fuel nozzle and bulkhead of a combustor assembly.

In FIG. 3, a side view of an exemplary embodiment of a combustion section 26 is provided including a fuel nozzle 200 and the bulkhead 56 of the combustor assembly 50. Referring now to FIGS. 1-3, the fuel nozzle 200 may extend at least partially through the bulkhead 56 and provide a fuel-air mixture 72 to the combustion chamber 62. The fuel nozzle 200 may include at least one fuel injector 210 and an aft body 220. The aft body 220 defines a forward wall 222 and an aft wall 224 each extended in the radial direction R. The aft body 220 further includes a plurality of sidewalls 226 (shown in FIG. 4) extended in the longitudinal direction L. The plurality of sidewalls 226 couples the forward wall 222 and the aft wall 224. At least one sidewall 226 defines an impingement fluid outlet 228. The aft body 220 may further define an impingement fluid cavity 230 in fluid communication with each impingement fluid outlet 228.

In various embodiments, the aft body 220 defines within the forward wall 222, the aft wall 224, and the one or more sidewalls 226 the impingement fluid cavity 230. The impingement fluid cavity 230 extends generally in the radial direction R, the longitudinal direction L, and at least in part in circumferential direction C (shown in FIGS. 4 and 5). The aft body 220 may further define the impingement fluid cavity 230 around the at least one fuel injector 210.

Figure 4:
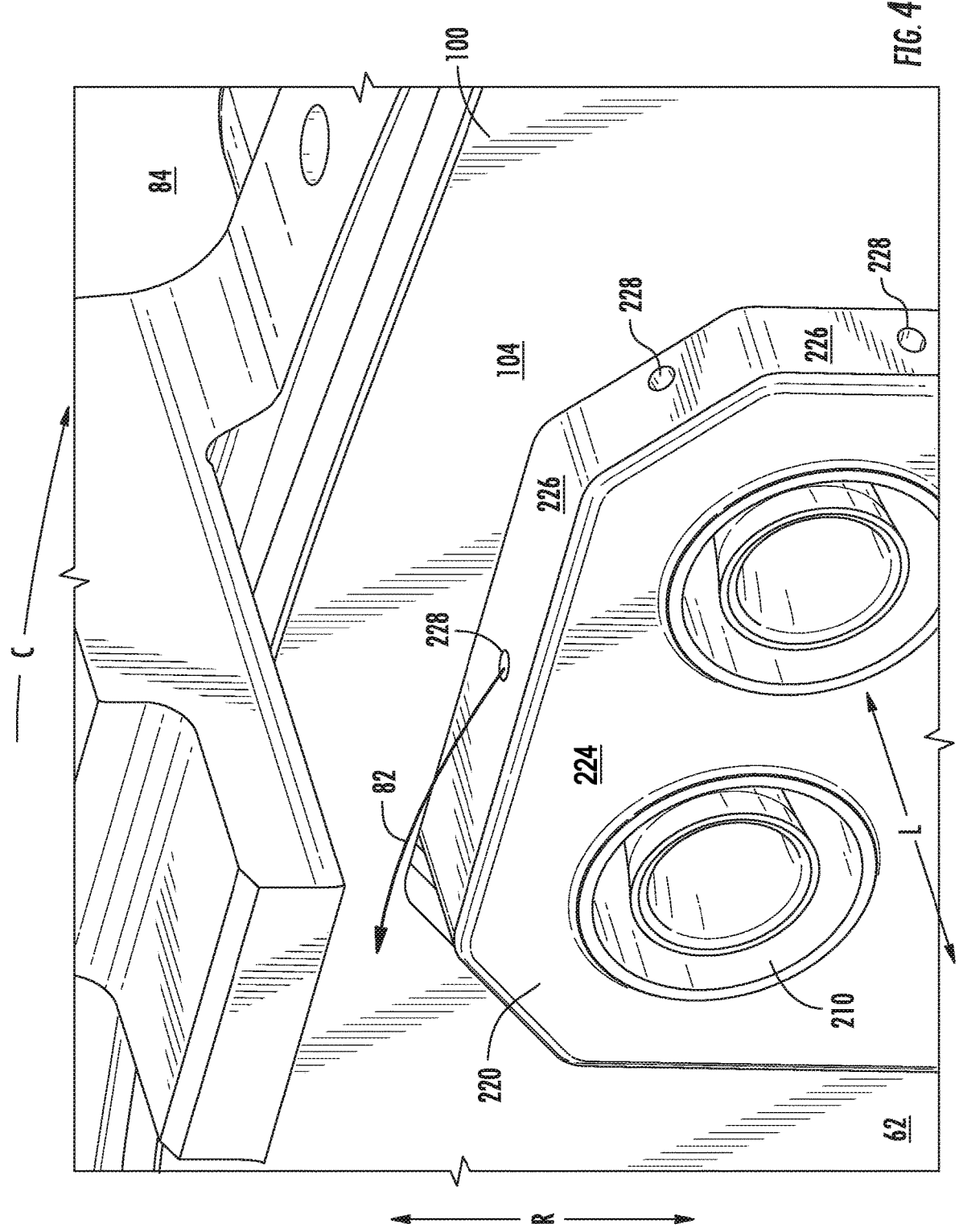
FIG. 4 is a perspective view of an exemplary embodiment of a fuel nozzle and bulkhead of a combustor assembly.

In an embodiment of the fuel nozzle 200, the one or more sidewalls 226 each define the impingement fluid outlet 228 extended in the radial direction R. In another embodiment, the impingement fluid outlet 228 extends in the circumferential direction C. In other embodiments, the impingement fluid outlet 228 extends in at least circumferential direction C and radial direction R (as shown in FIG. 4). In various embodiments, the impingement fluid outlet 228 may extend in the longitudinal direction L and the radial direction R and/or the circumferential direction C. For example, a first orifice 231 of the impingement fluid outlet 228 may be defined proximate to the impingement fluid cavity 230 and a second orifice 232 of the impingement fluid outlet 228 may be defined proximate to the bulkhead 56. In one embodiment, the first orifice 231 is defined at about the same position along the longitudinal direction L as the second orifice 232 (as shown in FIG. 3). In another embodiment, the first orifice 231 is defined at a different position along the longitudinal direction L as the second orifice 232 such that the impingement fluid outlet 228 extends along the longitudinal direction L and the radial direction R or circumferential direction C as shown in FIG. 7). In still other embodiments, the impingement fluid outlet 228 defines a serpentine passage within the aft body 220.

In one embodiment, the fuel nozzle 200 further defines in the aft wall 224 an impingement fluid inlet 229 in fluid communication with the impingement fluid cavity 230. The impingement fluid inlet 229 defines a passage through the aft wall 224 of the aft body 220. In one embodiment, the impingement fluid inlet 229 extends generally in the longitudinal direction L. In another embodiment, the impingement fluid inlet 229 extends along the longitudinal direction L in fluid communication with the impingement fluid inlet cavity 230. The impingement fluid inlet 229 may further extend along the radial direction R and/or circumferential direction C and the longitudinal direction L. In still another embodiment, the impingement fluid inlet 229 may define a serpentine passage.

In one embodiment, the fuel nozzle 200 may define in the aft body 220 the impingement fluid inlet 229, the impingement fluid cavity 230, and the impingement fluid outlet 228 in which each impingement fluid inlet 229 egresses to a discrete impingement fluid outlet 228 fluidly segregated from each adjacent impingement fluid inlet or outlet 229, 228. For example, the aft body 220 may define each impingement fluid inlet, cavity, and outlet 229, 230, 228 fluidly segregated such that each impingement fluid inlet, cavity, and outlet 229, 230, 228 defines an independent flow and/or pressure relative to another combination of impingement fluid inlet, cavity, and outlet 229, 230, 228.

In another embodiment, the fuel nozzle 200 includes a forward body 240. The forward body 240 may define at least one air inlet orifice 242 extended in the longitudinal direction L. In various embodiments, the at least one air inlet orifice 242 may extend along the radial direction R and/or circumferential direction C and the longitudinal direction L. In still other embodiments, the air inlet orifice 242 may define a serpentine passage within the forward body 240 (FIG. 7).

In another embodiment, the fuel nozzle 200 includes a forward body 240. The forward body 240 may define at least one air inlet orifice 242 extended in the longitudinal direction L. In various embodiments, the at least one air inlet orifice 242 may extend along the radial direction R and/or circumferential direction C and the longitudinal direction L. In still other embodiments, the air inlet orifice 242 may define a serpentine passage within the forward body 240 (FIG. 7).

The various embodiments of the fuel nozzle 200, the impingement fluid inlet 229, impingement fluid cavity 230, impingement fluid outlet 228, and air inlet orifice 242 together may provide thermal management that may improve structural performance of the fuel nozzle 200. The various embodiments may also provide thermal management benefits to the fuel 71 within the fuel nozzle 200, such as by desirably altering physical properties of the fuel 71 to aid combustion or prevent fuel coking within the fuel nozzle 200.

Referring back to FIGS. 1-3, during operation of the engine 10 a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 as a component of a prediffuser 65 into a diffuser cavity or head end portion 84 of the combustion section 26.

The compressed air 82 pressurizes the diffuser cavity 84. The prediffuser 65 generally, and, in various embodiments, the CEGV 67 more particularly, condition the flow of compressed air 82 to the fuel nozzle 200. In various embodiments, the prediffuser 65 and/or CEGV 67 direct the compressed air 82 to one or more air inlet orifices 242 (shown in FIG. 5) defined in the forward body 240 of each fuel nozzle 200.

Additionally, the compressed air 82 enters the fuel nozzle 200 and into the one or more fuel injectors 210 within the fuel nozzle 200 to mix with a fuel 71. In one embodiment, each fuel injector 210 premixes fuel 71 and air 82 within the array of fuel injectors 210 with little or no swirl to the resulting fuel-air mixture 72 exiting the fuel nozzle 200. After premixing the fuel 71 and air 82 within the fuel injectors 210, the fuel-air mixture 72 burns from each of the plurality of fuel injectors 210 as an array of compact, tubular flames stabilized from each fuel injector 210.

The LP and HP compressors 22, 24 may provide compressed air 82 for thermal management of at least a portion of the combustion section 26 and/or the turbine section 31 in addition to combustion. For example, as shown in FIG. 2, compressed air 82 may be routed into the outer flow passage 66 to provide cooling to the inner and outer liners 52, 54. As another example, at least a portion of the compressed air 82 may be routed out of the diffuser cavity 84. As still another example, the compressed air 82 may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Referring now to FIG. 3, an exemplary embodiment of the fuel nozzle 200 and the bulkhead 56 of the combustor assembly 50 of the engine 10 is provided. Referring now to FIGS. 1-3, the bulkhead 56 includes a wall 100 extended along the radial direction R, the longitudinal direction L, and in a circumferential direction C (not shown in FIGS. 1 and 2). The wall 100 defines an aft face 104, a forward face 106, and a longitudinal portion 102 therebetween. The longitudinal portion 102 of the wall 100 is adjacent to the plurality of sidewalls 226 of each fuel nozzle 200. In one embodiment, the longitudinal portion 102 of the wall 100 is adjacent to the impingement fluid outlet 228 of the fuel nozzle 200 in the radial direction R.

Referring to FIGS. 1-3, the bulkhead 56 further includes an annular seal ring 110 extended in the circumferential direction. The seal ring 110 is disposed upstream of the bulkhead 56. The seal ring 110 is further disposed outward and/or inward of the fuel nozzle(s) 200 along the radial direction R. The seal ring 110 defines a first seal 112 adjacent to the forward face 106 of the wall 100 of the bulkhead 56. The seal ring 110 further defines a second seal 114 adjacent to the first seal 112. In various embodiments, the second seal 114 may further define a flared lip 116 extended at least partially in the radial direction R and the longitudinal direction L toward the upstream end 99. In one embodiment of the seal ring 110, compressed air 82 applies a force onto the seal ring 110 toward the downstream end 98 to form a seal such that little or no fluid communication occurs between the diffuser cavity 84 and the combustion chamber 62. In another embodiment of the seal ring 110, the flared lip 116 increases an area that the compressed air 82 may apply force onto the seal ring 110 to augment the seal between the diffuser cavity 84 and the combustion chamber 62.

In one embodiment of the combustor assembly 50 shown in FIGS. 1-3, the compressed air 82 enters the fuel nozzle 200 through one or more air inlet orifices 242 defined in the forward body 240 of the fuel nozzle 200. The compressed air 82 may flow through the forward body 240 of the fuel nozzle to provide air for the one or more fuel injectors 210 of the fuel nozzle 200. In various embodiments, the compressed air 82 may provide thermal energy transfer between the fuel 71 within the forward body 240 of the fuel nozzle 200 and the compressed air 82. For example, in one embodiment of the engine 10, the fuel 71 may receive thermal energy from the compressed air 82. The added thermal energy to the fuel 71 may reduce viscosity and promote fuel atomization with compressed air 82 for combustion.

In another embodiment, the compressed air 82 flows through the forward body 240 to the one or more impingement fluid inlets 229 in the aft body 220. In still other embodiments, the compressed air 82 may direct around, above, and/or below (in the radial direction R) the forward body 240 to enter the fuel nozzle 200 through one or more impingement fluid inlets 229 defined in the aft body 220 of the fuel nozzle 200. The compressed air 82 may flow through the one or more impingement fluid inlets 229 into and through the impingement fluid cavity 230. In the embodiment shown in FIG. 3, the compressed air 82 exits the impingement fluid outlet 228 in fluid and thermal communication with the bulkhead 56. More specifically, the compressed air 82 may exit the impingement fluid outlet 228 in fluid and thermal communication with the longitudinal portion 102 of the wall 100 of the bulkhead 56 adjacent to the impingement fluid outlet 228.

Referring now to FIG. 4, a perspective view of a portion of the combustor assembly 50 is shown. In the embodiment shown in FIG. 4, the impingement fluid outlet 228 is disposed downstream of the wall 100 of the bulkhead 56. In one embodiment, the second orifice 232 may be defined downstream of the wall 100 of the bulkhead 56. In another embodiment, the second orifice 232 may be defined downstream of the wall 100 and proximate to the aft face 104 of the wall 100 such that the compressed air 82 is in fluid and thermal communication with the aft face 104 from the impingement fluid outlet 228. Defining the impingement fluid outlet 228 downstream of the wall 100 of the bulkhead 56 may affect flow and temperature at or near the wall 100 by cooling or buffering the wall 100 from combustion gases 86.

Referring now to FIGS. 1-4, in other embodiments, the fuel nozzle 200 may include structure such as a rigid or flexible tube to feed a cooling fluid through the impingement fluid outlet 228. The cooling fluid may work alternatively to the compressed air 82 through one or more of the air inlet orifice 242, impingement fluid inlet 229, the impingement fluid cavity 230, and/or the impingement fluid outlet 228 to provide thermal communication and thermal management to the fuel nozzle 200 and/or the bulkhead 56. For example, the cooling fluid may be an inert gas. As another example, the cooling fluid may be air from another source, such as an external engine apparatus, or from other locations from the compressors 22, 24 (e.g. bleed air).

Figure 5:
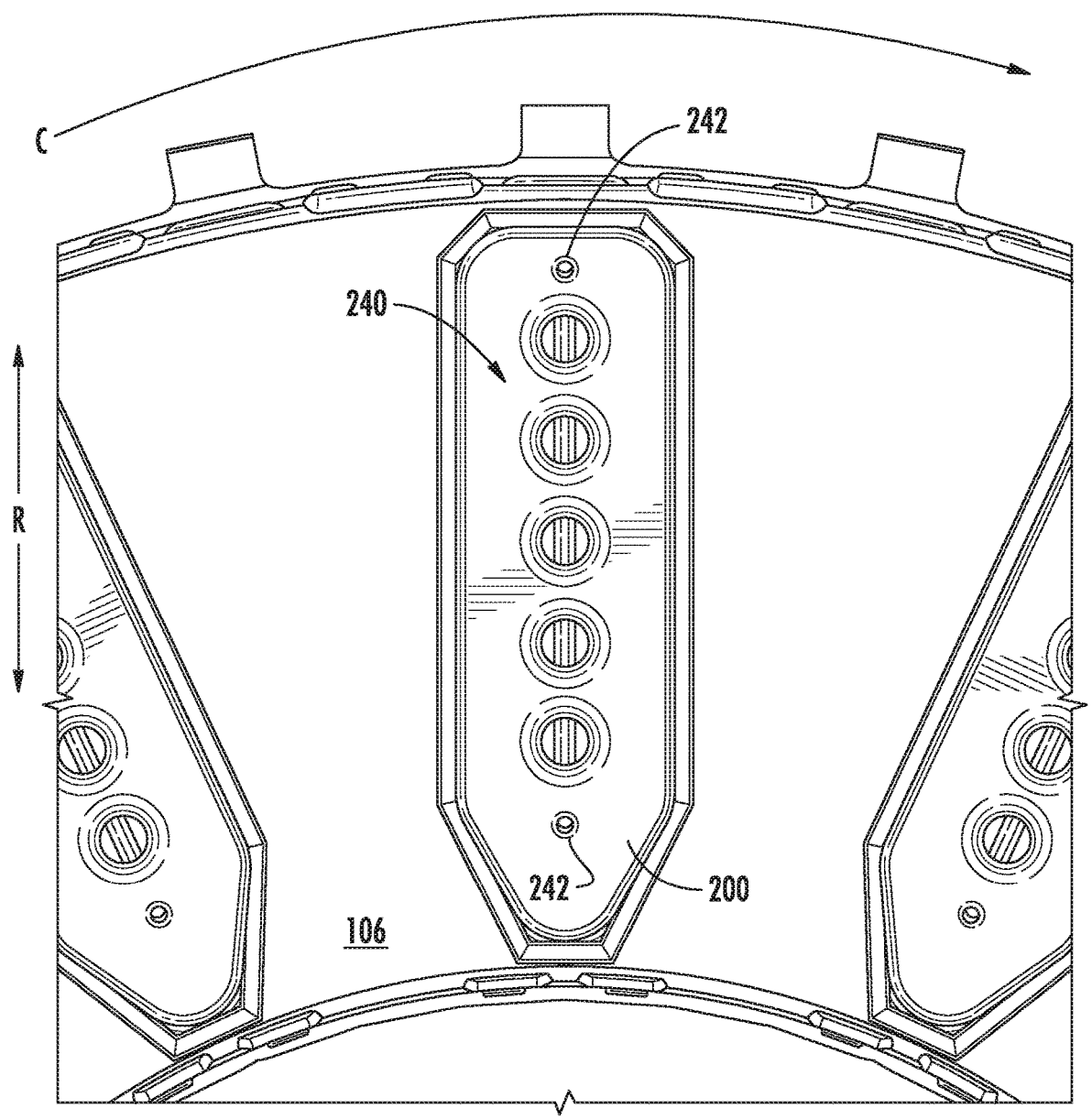
FIG. 5 is an upstream view of the exemplary embodiment of the fuel nozzle and bulkhead shown in FIG. 4.

Referring now to FIG. 5, an exemplary embodiment of the fuel nozzle 200 is shown from upstream viewed toward downstream. The embodiment shown in FIG. 5 show a portion of the bulkhead 56, the forward body 240 of the fuel nozzle 200, and at least one air inlet orifice 242. The embodiment in FIG. 5 further shows a plurality of air inlet passages 244 defined in the forward body 240 to feed compressed air 82 to one or more fuel injectors 100 and/or at least one impingement fluid inlet 229 (not shown in FIG. 5).

The fuel nozzle 200 and combustor assembly 50 shown in FIGS. 1-5 and described herein may be constructed as an assembly of various components that are mechanically joined or as a single, unitary component and manufactured from any number of processes commonly known by one skilled in the art. These manufacturing processes include, but are not limited to, those referred to as "additive manufacturing" or 3D printing". Additionally, any number of casting, machining, welding, brazing, or sintering processes, or mechanical fasteners, or any combination thereof, may be utilized to construct the fuel nozzle 200 or the combustor assembly 50. Furthermore, the fuel nozzle 200 and the combustor assembly 50 may be constructed of any suitable material for turbine engine combustion sections, including but not limited to, nickel- and cobalt-based alloys. Still further, flowpath surfaces may include surface finishing or other manufacturing methods to reduce drag or otherwise promote fluid flow, such as, but not limited to, tumble finishing, barreling, rifling, polishing, or coating.

Figure 6:
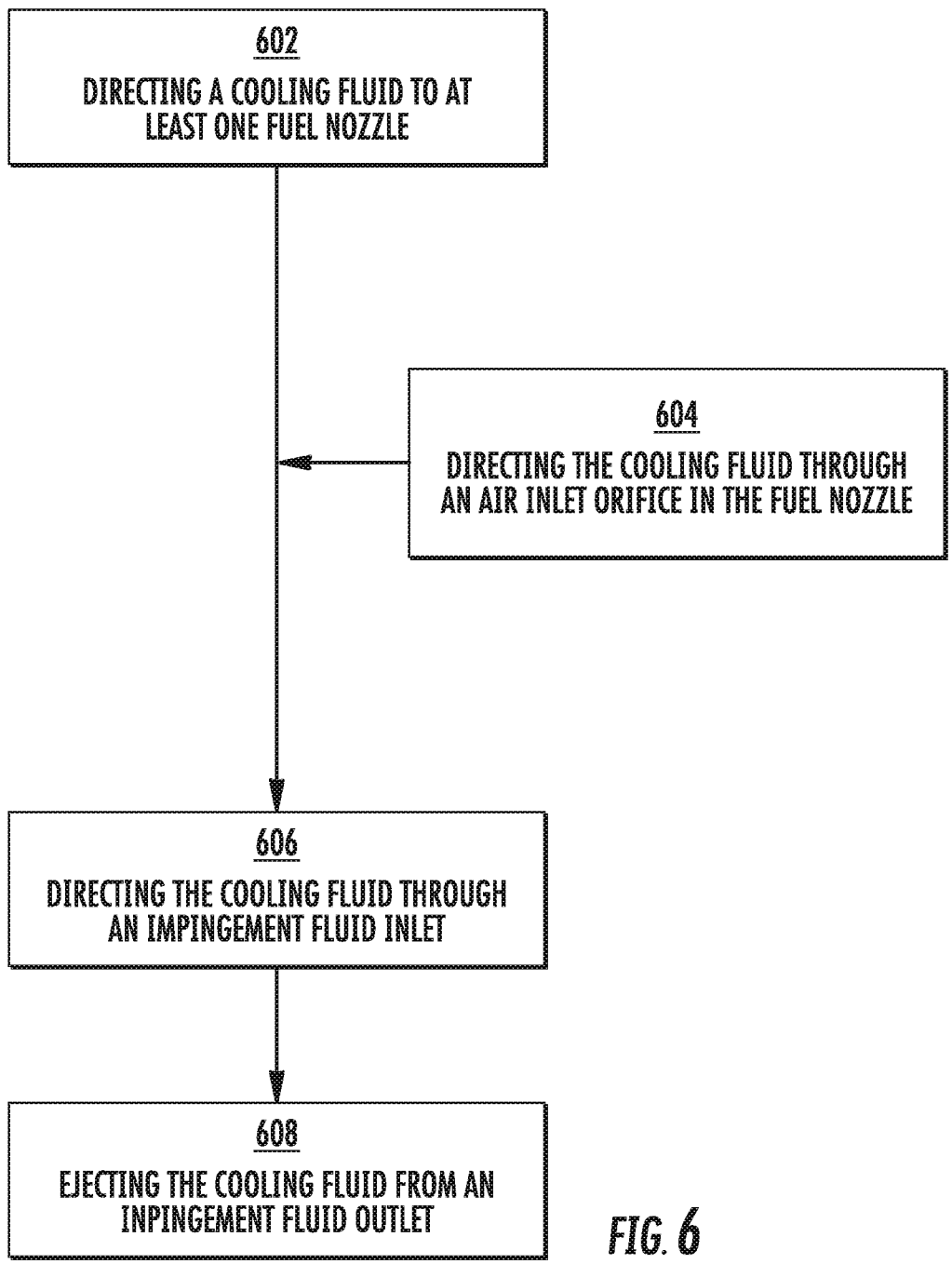

Referring now to FIG. 6, a flowchart outlining exemplary steps of a method of thermal management of a combustor assembly (herein referred to as "method 600") is generally provided. The flowchart shown in FIG. 6 depicts steps performed in a particular order for the purposes of illustration and discussion. Those of ordinary skill in the art, using the disclosures provided herein, will understand that various steps of any of the methods disclosed herein may be adapted, modified, rearranged, omitted, or expanded in various ways without deviating from the scope of the present disclosure.

The method 600 may include at (602) directing a cooling fluid to at least one fuel nozzle. For example, referring to the engine 10 depicted in FIGS. 1-5, the cooling fluid may be compressed air 82 directed from the compressors 22, 24 to the fuel nozzle(s) 200 of the combustor assembly 50. In various instances, the engine 10 may direct the compressed air 82 to the fuel nozzle 200 through the prediffuser 65 or, more specifically, the CEGV 67. In other instances not shown in FIGS. 1-5, the cooling fluid may be directed to the fuel nozzle(s) 200 via an external apparatus feeding into the combustor assembly 50, such as a bleed manifold, or hose, or other walled conduit.

In one embodiment of the method 600 at (604), the method 600 includes directing the cooling fluid through an air inlet orifice in the fuel nozzle, such as the air inlet orifice 242 shown and described in reference to fuel nozzle 200 shown in FIGS. 1-5. The method 600 at (606) includes directing the cooling fluid through an impingement fluid inlet, such as the impingement fluid inlet 228 described in regard to FIGS. 1-5.

At (608), the method 600 includes ejecting the cooling fluid from an impingement fluid outlet. For example, the method at (608) may include the impingement fluid outlet 228 and compressed air 82 ejecting onto the bulkhead 56 described in regard to FIGS. 1-5. As another example, ejecting the cooling fluid from the impingement fluid outlet 228 may include ejecting into the combustion chamber 62. As yet another example, ejecting the cooling fluid may transfer thermal energy from the fuel nozzle 200, or the fuel 71 therewithin, and/or the bulkhead 56. Ejecting the cooling fluid may include ejecting onto a longitudinal portion 102 of the wall 100. In still other examples, ejecting the cooling fluid from the impingement fluid outlet 228 may produce a buffer proximate to the aft face 104 of the wall 100 of the bulkhead 56 between the combustion gases 86 in the combustion chamber 62 that may restrict transfer of thermal energy from the combustion gases to the bulkhead 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle for a gas turbine engine, the fuel nozzle defining a radial direction, a longitudinal direction, a circumferential direction, an upstream end, and a downstream end, the fuel nozzle comprising:
   an aft body coupled to at least one fuel injector,
   wherein the aft body defines a forward wall and an aft wall each extended in the radial direction, and a plurality of sidewalls extended in the longitudinal direction,
   wherein the plurality of sidewalls couples the forward wall and the aft wall,
   wherein at least one sidewall defines an impingement fluid outlet, and wherein the aft body defines an impingement fluid cavity in fluid communication with the impingement fluid outlet,
   wherein the impingement fluid outlet is configured to provide a flow of fluid from the impingement fluid cavity, and
   wherein the aft wall defines an impingement fluid inlet in fluid communication with the impingement fluid cavity.

2. The fuel nozzle of claim 1, further comprising:
   a forward body coupled to the upstream end of each fuel injector, wherein the forward body defines at least one air inlet orifice extended in the longitudinal direction.

3. The fuel nozzle of claim 1, wherein the impingement fluid outlet defines a first orifice proximate to the impingement fluid cavity and a second orifice proximate to a bulkhead, wherein the first orifice is defined at a different position along the longitudinal direction as the second orifice such that the impingement fluid outlet extends at along the longitudinal direction and the radial or circumferential direction.

4. The fuel nozzle of claim 1, wherein the impingement fluid outlet, an impingement fluid inlet, and/or the impingement fluid cavity define a serpentine passage within the aft body.

5. A combustor assembly for a gas turbine engine, the combustor assembly defining a radial direction, a longitudinal direction, a circumferential direction, an upstream end, and a downstream end, the combustor assembly comprising:
   at least one fuel nozzle assembly,
      wherein each fuel nozzle assembly includes at least one fuel injector and an aft body coupled to each fuel injector,
      wherein the aft body defines a forward wall and an aft wall each extended in the radial direction, and a plurality of sidewalls extended in the longitudinal direction,
      wherein the plurality of sidewalls couples the forward wall and the aft wall,
      wherein at least one sidewall defines an impingement fluid outlet,
      wherein the aft body defines an impingement fluid cavity in fluid communication with the impingement fluid outlet,
      wherein the impingement fluid outlet is configured to provide a flow of fluid from the impingement fluid cavity; and
   a bulkhead including a wall extended in the radial direction, the longitudinal direction, and in a circumferential direction, wherein the wall defines an aft face, a forward face, and a longitudinal portion therebetween, and wherein the longitudinal portion of the wall directly faces the impingement fluid outlet.

6. The combustor assembly of claim 5, wherein the longitudinal portion of the wall of the bulkhead directly faces the impingement fluid outlet in the radial direction.

7. The combustor assembly of claim 6, wherein the impingement fluid outlet provides the flow of fluid defining compressed air in fluid and thermal communication with the longitudinal portion of the wall of the bulkhead.

8. The combustor assembly of claim 5, wherein the impingement fluid outlet is defined downstream of the wall of the bulkhead.

9. The combustor assembly of claim 5, wherein the impingement fluid outlet defines a first orifice proximate to the impingement fluid cavity and a second orifice proximate to the bulkhead, wherein the first orifice is defined at a different position along the longitudinal direction as the second orifice such that the impingement fluid outlet extends at along the longitudinal direction and the radial or circumferential direction.

10. The combustor assembly of claim 5, further comprising:
    a seal ring, wherein the seal ring defines a first seal and a flared lip, wherein the first seal directly faces the forward face of the wall of the bulkhead and the flared lip extends at least partially in the radial direction and the longitudinal direction toward the upstream end.

11. The combustor assembly of claim 5, wherein the aft wall defines an impingement fluid inlet in fluid communication with the impingement fluid cavity.

12. The combustor assembly of claim 11, wherein the impingement fluid outlet, the impingement fluid inlet, and/or impingement fluid cavity define a serpentine passage within the aft body.

13. The combustor assembly of claim 5, further comprising:
    a forward body coupled to an upstream end of each fuel injector, wherein the forward body defines at least one air inlet orifice extended in a longitudinal direction.

14. The combustor assembly of claim 13, wherein the at least one air inlet orifice defines a serpentine passage.

15. A method of thermal management of a combustor assembly, the combustor assembly including a bulkhead and at least one fuel nozzle assembly extending through the bulkhead, the method comprising:
    directing a cooling fluid to a fuel nozzle;
    directing the cooling fluid through an impingement fluid inlet of the fuel nozzle; and
    ejecting the cooling fluid from an impingement fluid cavity through an impingement fluid outlet onto a longitudinal portion of a wall of the bulkhead, the impingement fluid outlet defined through a sidewall of the fuel nozzle.

16. The method of claim 15, further comprising:
    directing the cooling fluid through an air inlet orifice in the fuel nozzle.

17. The method of claim 15, wherein ejecting the cooling fluid from the impingement fluid outlet includes ejecting the cooling fluid from the impingement cooling cavity into a combustion chamber.

18. The method of claim 15, wherein ejecting the cooling fluid from the impingement fluid outlet includes producing a buffer proximate to an aft face of a wall of the bulkhead between combustion gases in a combustion chamber.

* * * * *